United States Patent Office 3,555,148
Patented Jan. 12, 1971

---

3,555,148
FUNGICIDES
Tatsuo Katsumura and Hirohisa Kataoka, Suita-shi, Osaka-fu, and Yutaka Mizuno, Osaka-shi, Japan, assignors to Nitto Kasei Co., Ltd., Osaka, Japan, a corporation of Japan
No Drawing. Filed Oct. 20, 1965, Ser. No. 499,057
Int. Cl. A01n 9/00
U.S. Cl. 424—78                    1 Claim

---

ABSTRACT OF THE DISCLOSURE

Compositions active against microorganisms comprising a carrier and as an active ingredient a member selected from the group consisting of: homopolymers of bis-tributyltin itaconate, homopolymers of atributyltin butyl itaconate, homopolymers of bis-triphenyltin itaconate, copolymers of bis-tripropyltin itaconate and methacrylic acid, and intercopolymers of bis-tributyltin itaconate and bis-tripropyltin itaconate.

---

Recently fungicides comprising an organotin compound like lower trialkyltin and triphenyltin compounds as an effective ingredient have begun to be used for killing and controlling plant viruses, wood destroying fungi and the other pestiferous organisms. Although these organotin compounds have excellent fungicidal activity, they are too phytotoxic for use on growing plants, and consequently their applications to crops are restricted within narrow limits. Besides they have the offensive odour peculiar to the organotin compound and irritant action and cause violent physiological phenomena to men and beasts. Also in chemical stability and vapor pressure there are lots of difficulties and so decisive one is not found yet.

We inventors have studied to improve on this well-known organotin compounds and have found that high molecular compound, which is formed by introducing residue of organotin compound into carboxylic radical of itaconic acid and by polymerizing the resultant monomer, retains the powerful fungicidal activity of organotin compounds, holds its durable effect and has sufficient properties as fungicides without regard to the degree of polymerization.

This invention relates to the non-medical fungicides comprising as an effective ingredient a homopolymer of an unsaturated organotin compound of the formula

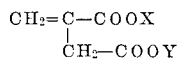

wherein both X and Y are

or either X or Y is

and the other is —HgC$_6$H$_5$, hydrogen, alkyl having not more than 12 carbon atoms, phenyl or benzyl radical, and R$_1$, R$_2$, and R$_3$ are alkyl having not more than 6 carbon atoms or phenyl radical, which may be identical or different, an intercopolymer of said unsaturated organotin compounds or a copolymer of said unsaturated organotin compound with other polymerizable unsaturated compound.

The monomers of polymerizable unsaturated compounds which may be copolymerized with the monomers of the unsaturated organotin compounds represented by the aforesaid general formula may include vinyl compounds such as butadiene, itaconic acid, vinyl chloride, vinyl acetate, vinylidene chloride, styrene, p-chlorostyrene, vinyl toluene, 2-vinyl furan, etc., acrylic compounds such as acrylic acid, methacrylic acid, alkylesters thereof, organotin salts thereof, acrylonitrile, acrylamide, glycidyl-methacrylate, etc. or the mixtures thereof.

The polymers of tin compounds employed in this invention can be obtained easily in the desired degree of polymerization and tin content by polymerizing the monomers of aforesaid general formula, the mixtures of these monomers of unsaturated organotin compounds, or the mixtures of monomers of unsaturated organotin compounds with monomers of other copolymerizable unsaturated compounds in the presence of radical polymerization initiating catalysts of organic peroxides, azocompounds, persulfates, etc. in each polymerization form of mass, solution, suspension and emulsion polymerization. In such circumstance, polymers can be obtained easily in liquid, rubbery, and solid form depending upon the triorganotin radical derived from R$_1$, R$_2$ and R$_3$, the kind of unsaturated carboxylic acid residue, the kind and the ratio of monomer of other copolymerizable unsaturated compound, or the degree of polymerization. The polymers so produced are soluble in organic solvents like aromatic hydrocarbon, ketone, ester and halogenated hydrocarbon.

The preparation of illustrative polymers of tin compounds used in the compositions of this invention are described below.

PREPARATION SERIES 1

Polymer of bis-tributyltin itaconate 149 grams of bis-tributyltin oxide, 32.5 grams of itaconic acid and 500 cc. of benzene were placed in a 1-l. flask equipped with a Barret moisture trap. The solution was stirred at a temperature equal to the boiling point of benzene for 2 hours. After reaction benzene was distilled off, white solid obtained was recrystallized from diethyl ether, and a yield of 167 grams of white crystal, melting at 60.5° to 61.5° C., was obtained. 1.7 grams of benzoyl peroxide was added as a radical polymerization initiator to bis-tributyltin itaconate monomer thus obtained, the mixture was polymerized at 110° to 115° C. for 5 hours, the product was washed with 15% water-containing methanol, and 155 grams of a light yellow-colored viscous liquid (viscosity at 30° C.; 740 cp.) was obtained. This had a mean molecular weight of about 9800 (osmotic pressure method) and was soluble in butanol, acetone, toluene, etc.

PREPARATION SERIES 2

Polymer of α-tributyltin butyl itaconate

A mixture of 112 grams of itaconic anhydride (1 mole) and 77 grams of butanol was heated at 90° to 100° C. for 2 hours and then the mixture was condensed at reduced pressure. 298 grams (0.5 mole) of bis-tributyltin oxide was added to the residual liquid and the reaction mixture was treated in the same manner as Preparation Series 1. 150 grams of toluene and 2.4 grams of benzoyl peroxide were added to 470 grams of liquid α-tributyltin butyl itaconate monomer thus obtained and the mixture was polymerized at 90° to 100° C. for 48 hours. Viscous solution produced was dried at reduced pressure after washing with 10% water-containing methanol and 387 grams of rubbery polymer (tin content; analyzed 24.69%, calculated 24.46%) was obtained. The polymer had a mean molecular weight of about 32,000 and was soluble in toluene, butanol, etc.

PREPARATION SERIES 3

Copolymer of bis-tripropyltin itaconate and methacrylic acid 62.4 grams (0.1 mole) of bis-tripropyltin itaconate (M.P. 66° to 67.5° C.), 4.3 grams (0.5 mole) of methacrylic acid, 0.15 gram of potassium persulfate, 5 grams of surface active agent (trade name; Nonion NS 210), and 150 grams of water were placed in a flask, heated by degrees, and stirred at 90° to 95° C. for 48 hours. The precipitate was separated after cooling, washed with acetone, dried at reduced pressure, and 44.8 grams of solid polymer (analyzed tin content; 35.29%, the ratio of bis-tripropyltin itaconate to methacrylic acid; 1 mole to 0.57 mole) was obtained. The polymer was soluble in toluene, butanol, perclene, etc.

Differing from well-known monomers of organotin compounds such as oxide, halide, inorganic acid salt, and organic acid salt of trialkyltin and triphenyltin, polymers of organotin compounds employed in this invention are remarkably low phytotoxic to plants, durable in fungicidal activity for their stability in sunlight, and harmless if the handlers should inhale the gas, vapor, powder, etc. of the polymers at the time of manufacturing fungicidal agents and at the time of using that and easy to handle due to no unpleasant smell common to the organotin compounds, no stimulation, and slight and negligible toxicity to men and beasts. Furthermore as stated hereinabove, suitable choice of monomers of tin compounds or monomers of unsaturated compounds which may be copolymerized with monomers of tin compounds enable the production of polymers with satisfactory properties of adhesion and cohesion.

In practice of the compositions of this invention, aforementioned polymers may be used as fungicidal formulations in the forms of a dust, a wettable powder and a liquid agent, etc. according to their physical properties and application forms. In case of using said compositions as a dust or a wettable powder, the polymers in this invention are mixed with carriers such as kaolin, clay, talc, diatom earth, bentonite, calcium carbonate, etc., if necessary assistants e.g. surface active agents such as spreading agents, emulsifiers, wetting agents, depositing agents, etc. are added to them, the mixtures are ground, and uniformly powdered formulations are obtained. Typical surface active agents which may be employed in this invention include the following: higher alcohol sulfate, ligninsulfonic acid salt, etc. (anionic), alkyl dimethyl benzyl ammonium chloride, alkyl piridinium chloride, etc. (cation), polyoxyethylene alkylarylether, polyoxyethylene sorbitan monolaurate, etc. (non-ionic), and lauryl amine derivatives, dodecyl amino ethyl glycin, etc. (ampholytic). In case of liquid agents, the polymers in this invention are dissolved in toluene, butanol, methyl ethyl ketone, perclene, etc.; if necessary aforementioned surface active agents are added, and uniform liquid agents are obtained. The fungicides in this invention may also be used mixing with agricultural fungicides, insecticides, herbicides, fertilizers, etc. In addition, the fungicides in this invention are as effective fungicides for wood and pulp manufacturing use as well-known organotin compounds.

Effect tests for polymers of organotin compounds employed in this invention are illustrated as follows.

TEST SERIES 1

Tests for fungal resistance

Preparations tested:

(A) Polymer of α-triethyltin butyl itaconate
(B) Copolymer of bis-tripropyltin itaconate and methacrylic acid (2:1)
(C) Polymer of bis-tributyltin itaconate
(D) Polymer of α-tributyltin methyl itaconate
(E) Polymer of bis-triphenyltin itaconate
(F) Bis-tributyltin oxide Slant culture medium which contain each of aforesaid fungicides were inoculated with each of fungi mentioned below in Table I, bacteria of which were cultured at 37° C. for 24 hours, molds of which were cultured at 28° C. for one week. Mediums employed were meat juice agars for bacteria and white potato agars for molds. Table I shows the minimum concentration that just prevented any attack, which was determined by the dilution method.

TABLE I

| Fungus | Minimum concentration (p.p.m.) for complete inhibition of growth | | | | | |
|---|---|---|---|---|---|---|
|  | A | B | C | D | E | F |
| Staphylococcus aureus | 6.4 | 0.8 | 0.2 | 0.4 | 6.4 | 0.2 |
| Escherichia coli | 50 | 50 | 400 | >400 | >400 | 400 |
| Aspergillus niger | 12.8 | 1.6 | 0.8 | 1.6 | 1.6 | 0.8 |
| Penicilium citrinum | 12.8 | 3.2 | 0.8 | 0.8 | 3.2 | 0.8 |
| Cha:tomium globosum | 6.4 | 0.8 | 0.4 | 0.4 | 3.2 | 0.4 |

TEST SERIES 2

Tests for inhibiting the growth of spore of *miyabianus oryzae*

0.1, 1.0, and 5.0 p.p.m. of liquid preparations were formulated for each preparation used in Test Series 1. The mixtures of 1 cc. of these liquid preparations and 1 cc. of suspensions of spore of *Miyabianus oryzae* were shaken well and were exposed for 24 hours in thermo-hygrostat by the drop culture method. Table II shows the germination rates (percent) of spore which were observed through a microscope.

| | Concentration (p.p.m.) of preparation | | | | Concentration (p.p.m.) of preparation | | |
|---|---|---|---|---|---|---|---|
| | 0.1 | 1.0 | 5.0 | | 0.1 | 1.0 | 5.0 |
| A | 33 | 5 | 0 | D | 21 | 1 | 0 |
| B | 29 | 6 | 0 | E | 21 | 2 | 0 |
| C | 17 | 0 | 0 | F | 16 | 0 | 0 |

TEST SERIES 3

Tests for an effect on rice-plant fever 18 pots of twenty-centimeter-tall aquatic rice (the kind: Jukkoku) cultivated under glass were provided and 40 cc. of preparations were scattered on each of the pot. 1 day and 10 days after scattering, rice-plant fever was inoculated thereinto. Table III shows the phytotoxicity which was estimated 5 days after scattering and the number of affected ill spots on the leaf of the aquatic rice which was inspected 15 days after inoculating. The phytotoxicity of the aquatic rice was assessed in the following way.

— : No phytotoxicity
+ : Trace of phytotoxicity
++ : Substantial phytotoxicity
+++ : Depauperation

TABLE III

| Preparation | Concentration scattered (dilution) | Number of affected ill spots to a leaf | | Phytotoxicity |
|---|---|---|---|---|
| | | Inoculated 1 day after scattering | Inoculated 10 days after scattering | |
| 10% emulsion of B | ×1,000 | 0 | 0.51 | — |
| 10% emulsion of C | ×1,000 | 0 | 0.39 | — |
| 10% emulsion of F | ×1,000 | (1) | (1) | +++ |
| Control (no scattering) | | 2.53 | 2.58 | — |

1 Uncountable.

TEST SERIES 4

Phytotoxicity tests

About the time when two or three main leaves of potted crops which were cultivated under glass unfolded, liquid preparations were scattered well to the degree of running down with a sprayer over the leaves. After that, the pots were kept in a hothouse and the degree of phytotoxicity was determined by visual inspection after 5 days. Table IV shows the results.

TABLE IV

| | Concentration applied (p.p.m.) | Crops tested | | | |
|---|---|---|---|---|---|
| | | Aquatic rice | Cucumber | Chinese cabbage | Sugar beet |
| 10% emulsion of C | 50 | − | − | − | − |
| Do | 100 | − | − | + | − |
| 10% emulsion of F | 50 | ++ | ++ | +++ | ++ |
| Do | 100 | +++ | +++ | (1) | +++ |

1 Impossible examination.

TEST SERIES 5

An effect on wood destroying fungi preparations used:

G Copolymer of bis-tributyltin itaconate and tripropyltin methacrylate (1:1)
F Bis-tributyltin oxide Each fixed quantity of liquid preparations having concentrations as stated below in Table V of G and F was added to and mixed up with malt agars. After they were solidified, each of mycelia of fungi as stated below in Table V was incubated on the malt agars so treated at 28° C. ±5° C. at a relative humidity of more than 75% for 14 days. Table V shows the results.

TABLE V

| Fungus tested | Minimum concentration (p.p.m.) for complete inhibition of growth | |
|---|---|---|
| | G | F |
| Poria vaporaria | 50 | 100 |
| Trametes sanguinea | 50 | 100 |
| Schizophyllum commune | 50 | 100 |

Example 1

A scattering-liquid agent was made by mixing and dissolving 15% of copolymer of bis-tripropyltin itaconate and methacrylic acid (2:1), 65% of xylene, 10% of methyl isobutyl ketone, and 10% of polyoxyethylene-nonyl 1/phenyl ether, then diluting with water.

Example 2

A scattering-liquid agent was made by mixing and pulverizing 10% of polymer of bis-tributyltin itaconate, 3% of sodium ligninsulfonate and 87% of an equivalent mixture of diatom earth and clay, then diluting with water.

Example 3

A dust was made by mixing and pulverizing 2% of polymer of α-tributyltin methyl itaconate and 98% of talc.

Example 4

A wettable powder was made by mixing and pulverizing 10% of polymer of bis-triphenyltin itaconate, 5% of sodium higher alkyl sulfate and 85% of clay.

We claim:

1. A composition active against microorganisms comprising a carrier and as an active ingredient a member selected from the group consisting of: a homopolymer of bis-tributyltin itaconate, a homopolymer of α-tributyltin butyl itaconate, a homopolymer of bis-triphenyltin itaconate, a copolymer of bis-tripropyltin itaconate and methacrylic acid, and an intercopolymer of bis-tributyltin itaconate and bis-tripropyltin itaconate.

No references cited.

STANLEY J. FRIEDMAN, Primary Examiner

U.S. Cl. X.R.

260—429.7; 424—288